M. LANE.
Foot Gage.
No. 33,307.
Patented Sept. 17, 1861.
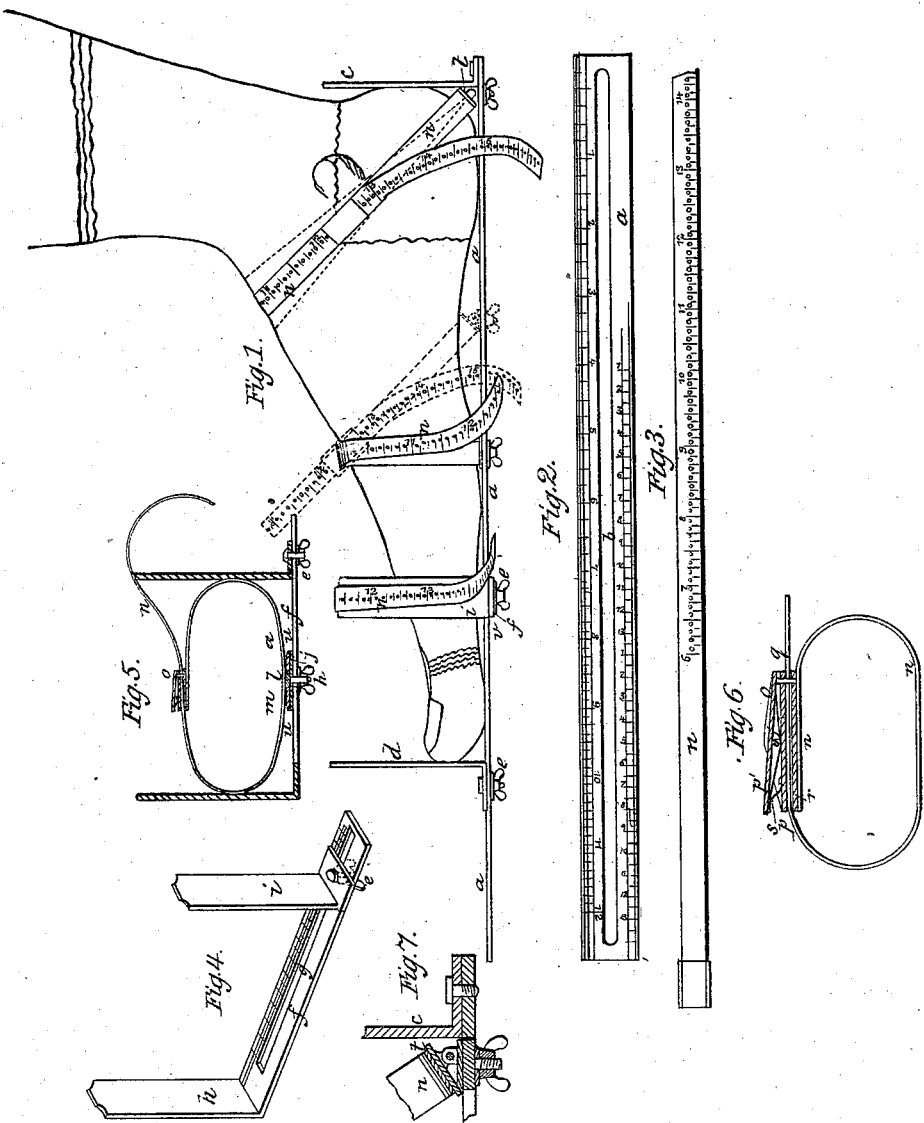

UNITED STATES PATENT OFFICE.

MARCUS LANE, OF WASHINGTON, DISTRICT OF COLUMBIA.

IMPROVEMENT IN SHOE-MAKERS' MEASURES.

Specification forming part of Letters Patent No. 33,307, dated September 17, 1861.

*To all whom it may concern:*

Be it known that I, MARCUS LANE, of the city and county of Washington, District of Columbia, have invented a new and Improved Implement or Apparatus for Ascertaining the Size and Form of Feet and Conforming Lasts Thereto.

A difficulty has heretofore existed in ascertaining with sufficient accuracy the size and form of the human foot, especially in cases where shoe-makers have been required to make a boot or shoe for a person having tender feet, or where for any cause the natural soundness and form of the feet have become impaired, and this difficulty has been enhanced owing to the fact that the tape-measures heretofore used for taking the dimensions of the foot have been constructed of material liable to stretch in the hands of the operator during the act of measuring, and thus produce inaccuracy.

Another difficulty has heretofore existed in the fact that the foot has been subjected to the operation of measuring at as many different times as different measures have been taken of the several parts—that is to say, first the length of the foot would be taken, then the breadth, then the circumference at the "ball," then the circumference at the "hollow," and thereafter the measure of the "instep," all of which are separate and distinct operations, the foot being at no time during such measuring process simultaneously in contact with the measures or tapes so used for taking the several dimensions, whereas in my apparatus and by my mode of taking the measure all parts of the foot which require to be measured are at one time during the act of measuring in contact with the measures which indicate the size and outline of the foot, and thus the person whose foot is being measured may determine precisely how the boot or shoe will fit and feel from the simultaneous contact of the several measures, and so tighten the apparatus at one point and loosen at another, as may be desired. This being determined to the satisfaction of the person whose foot is being measured, the foot is then withdrawn from the apparatus, leaving its several measuring parts undisturbed. Thus the measure of the foot may not only be ascertained with exactitude, but the apparatus may thereafter be used to fit a last to the dimensions so ascertained.

My said invention relates, therefore, to the construction of an apparatus by means of which variously-sized feet may be measured, at the same time affording the means by which a last can be made to conform to the measure ascertained; and I do hereby declare that the following is a full, clear, and exact description thereof, reference being had to the accompanying drawings, and to the letters of reference marked thereon, and which form a part of my specification, in which—

Figure 1 represents a view with the apparatus applied to the foot; Fig. 2, a plan view of the base bar or plate; Fig. 3, a plan view of the tapes used for ascertaining the measure over various parts of the foot; Fig. 4, a perspective view of the cross-bar for ascertaining the breadth of the foot and width of the sole; Fig. 5, a sectional view of Fig. 4, together with a section of the tapes used in taking the measure, with the clasp to hold the tape in position and the means of attaching the tape shown in Fig. 5 to the cross-bar shown in Fig. 4; Fig. 6, an enlarged sectional view of the clasps with tape attached, and Fig. 7 an enlarged sectional view of the instep-tape hinged to the side in rear of the heel, as shown in Fig. 1.

Like letters denote the same parts in the several figures.

I will now proceed to describe my said apparatus according to statute in such case made and provided.

$a$ is a metallic base-plate, having a longitudinal slot $b$ running through the same from end to end, as represented in Fig. 2, with a heel-standard $c$ secured by a screw at one end thereof and a sliding toe-standard $d$, at or near the opposite end, held in place at any desired point on the scales upon said base-plate by a set-screw $e$, said base-plate being provided with a scale in inches and fractions thereof down to quarters of an inch on its right-hand side for indicating the length of the foot, and a scale in thirds and sixths of an inch on its left-hand side for the purpose of indicating the scale of sizes of lasts which are in the market ready made and in common use. Situate at right angles with the base-bar is a cross-bar $f$, having a slot $g'$ running longitudinally through the same, with a scale of inches and fractions of an inch down to quarters of an inch marked thereon, as shown in Fig. 4. To one end of this cross-bar is a permanent standard $h$, and near its opposite end is a movable or sliding standard $i$, held in place at any desired point on the scale of the cross-bar by a set-screw $e$, all of which is clearly shown in perspective view by Fig. 4 and in section by Fig. 5. This cross-bar in use is applied to the ball of the foot, and indicates the breadth of the foot at the ball, and is shown so applied in Fig. 1. Said cross-bar is attached to the base-bar by means of an intermediate plate $j$, the sides of which are formed with projecting lips $v$, which clasp the outer edges of cross-bar $f$, and with projecting lips $u$, which clasp the outer edges of the base-bar $a$. Through this plate $j$ passes a shank $k$, with a screw-thread cut thereon adapted to a screw-nut for tightening and holding in place the cross-bar. To the upper end of the shank $k$ is attached a shoulder $l$, which is made to exactly fit and travel in slot $b$ of bar $a$ with projections $m$ resting upon the face of said bar $a$. By these means the cross-bar $f$ can be slid either to the right or left and at right angles with the base-bar $a$, or in a direction longitudinal with said bar $a$, according as the width of the foot may determine the position of the cross-bar to the right or left with reference to the base-bar, and also according as the location of the ball of the foot may determine the position of the cross-bar upon the bar $a$ in a longitudinal direction. Said cross-bar determines the breadth of the foot as well as the width of the boot or shoe at this point; but at this point it is necessary also to ascertain the circumference of the foot, and this should be done with the greatest nicety compatible with ease and comfort to the person who is to wear the boot or shoe the measure of which is being taken. To this end I construct a metallic tape $n$, brass preferred, having marked upon it a requisite number of inches—say twelve—divided off into half-inches, quarters, eighths, and sixteenths of an inch. Of these fractional parts of an inch I indicate the "sixteenths" by perforations through the tape. To the inner end of tapes $n$ I permanently attach a clasp O by brazing or in any suitable manner, such clasp being clearly shown by an enlarged sectional view in Fig. 6, with one of the tapes passed between a central plate $p$ and the bottom of the clasp. The central plate is of the same length and nearly of the same width as the bottom plate, and fits snugly into the latter just a sufficient distance above said bottom plate to allow the tape to be readily drawn through the clasp.

To the sides of the bottom plate I hinge a pressure-plate $p'$, having a pin or pintle $q$ secured to the under side of the forward portion of the pressure-plate, and which pin, in the action of the clasp, passes down through the central plate $p$, tape $n$, and into the bottom plate $r$, and is there held in position by the action of a spring $s$, as shown in Fig. 6. This clasp and tape I attach to the shoulder $l$, Fig. 5, the forward end of the clasp indicating on the tape the desirable circumferential measure of the foot, and held in such position by the passage of the pintle through the tape and into the bottom plate.

In rear of the cross-bar $f$ and at the forward portion of the hollow of the foot I apply a like tape and clasp, which are attached to an ordinary sliding plate, held in place upon the bar $a$ by a set-screw. In the drawings, Fig. 1 shows this second tape with its sliding plate applied near the forward termination of the hollow of the foot. It is evident, however, that it may be used further back and nearer to the central portion of the hollow of the foot, as the judgment of the operation may dictate, having regard to peculiarities in the formation of the member being measured, the design in taking the measure being to properly secure the exact size of the prominent portions and the relative distances between them, the former being shown by the tapes and the latter by the scale on the right-hand side of the base-plate $a$.

Lastly, at the rear portion of the instrument or apparatus I apply a third tape and clasp constructed as aforesaid, and which is also attached to a slide working longitudinally in the slot $b$ of base-plate $a$, and held in position by a set-screw, as seen in Fig. 1. This slide, however, possesses this peculiarity, to wit: that it is hinged to a plate $t$, to which plate the tape $n$ is permanently attached in a suitable manner, and like the slides before named is made to travel at the will of the operator in the slot $b$ of the base-plate $a$. This last-named tape is for taking the measure of the instep of the foot, and is hinged, as shown in Figs. 1 and 7, in order that when the slide to which it is attached is placed in proper position, as seen in Fig. 1, it may be adjusted in the arc of a circle to suit the highest elevation of the instep within the range of the segment of the arc which the tape is permitted by its construction and attachment to the slide to describe. Were this tape attached to its slide in a rigid position, it is evident that it could not in some cases be made to measure over the highest point of the instep without bringing the slide immediately beneath the heel and so fail to secure the true measure of the instep with reference to the farthest rear portion of the heel. This movement of the instep-tape is indicated by dotted lines in red in Fig. 1.

Supposing the measure of the foot to have been taken as represented in Fig. 1 and the person to have rested his foot upon the floor for the purpose of ascertaining the ease and comfort of the measure, a withdrawal of the foot can thereupon be effected by simply "starting" the set-screw and thrusting the slide and tape a little forward, or, if needs be, as far forward as shown in red in Fig. 1.

The slide and tape for measuring the instep can then be returned to the position previously occupied, and the machine or apparatus can then be examined to ascertain the various measures indicated on the several scales. At this point of the operation it will be observed that all the working parts of the apparatus remain fixed and indicate or register precisely the same as when the foot was inclosed by them. The measure of the foot having been taken and it being desirable to fit a last to such measure, the operator casts his eye upon the scale placed upon the left-hand side of the base-plate and there finds the scale of sizes of lasts as commonly numbered and prepared for the market, and is thus enabled to select the one which will most nearly fit the measure of the foot as taken by the apparatus, the required number of the last being signified on the scale by the toe-standard $d$. A last of the number desired is then taken, and by repeated insertion into the apparatus is accurately fitted and adjusted so as to conform to the real measure of the foot as taken by the implement.

The ease and celerity in taking not only the circumferential measure of the foot but in conforming a last thereto is greatly enhanced by the use of my metallic straps, for the reason that such straps when the foot is withdrawn retain themselves in a great measure in the contour or outline of the foot, and thus hold themselves in a proper condition to present to the eye of the operator the measure indicated by the scale on the straps. Besides this, such quality possessed by my straps admits of the ready insertion, adjustment, and withdrawal of the last, which would not be the case with the ordinary shoe-maker's strap, particularly after it had been a short time in use, a very little use rendering such straps exceedingly pliable, limber, and unself-sustaining. On my machine, therefore, such ordinary straps, their stretching quality also being considered, could not with either certainty or convenience be used.

It should be here stated that the last-scale, as shown upon the base-plate $a$, is numbered from No. 1 to No. 13, inclusive, and is immediately followed by another scale of like character. If, then, the toe-standard should indicate, for example, No. 5 or No. 10 on the first scale, the number of the last sought for would be No. 5 or No. 10 "child's lasts," and if the toe-standard should indicate on the second scale No. 5 or No. 10, then the proper last would be No. 5 or No. 10 "adults."

It may also be remarked that the apparatus is adapted for measuring both the right and left foot, and that a last may be inserted and withdrawn by manipulating the instep-measure forward or back, much in the same manner as is required for inserting and withdrawing the foot. For a very nice and careful measure of the outline of particular parts of the foot, straps or tapes sufficiently ductile to be easily bent by the fingers might be used, and when the operator comes to apply the last to such measure the irregularities formed in such straps or tapes could be correspondingly inversely applied to the last by pieces of leather tacked thereon.

Having thus described the construction and operation of my improved apparatus for ascertaining the size and form of feet and for conforming lasts thereto, what I claim as my invention, and desire to secure by Letters Patent, is—

1. A machine for taking and determining simultaneously the measures of the foot containing the following devices, to wit: first, means for taking the measure of the length of the foot; second, means for taking the various measures desired of the transverse span of the foot, and, third, means for retaining the measuring indices or devices in position so as they shall allow the fitting of a suitable ast thereto.

2. In an organized machine for taking the measure of the foot of a person, the use of flexible non-elastic straps or tapes, as contradistinguished from such elastic straps or tapes as are in common use for measuring the foot.

3. The tapes $n$, in combination with the clasps O, as described, by means of which the holes in the tapes perform the double function of retaining the measure when taken at the same time they indicate the fractions of an inch of the measure.

4. In an organized machine which is capable of determining the circumferential span as well as the longitudinal measure of the foot, an instep-measuring tape which is capable of accommodating itself to the varying heights of insteps to be measured.

5. The instep-measuring strap or tape $n$ and slide $t$, in combination with the base-plate $a$, by means of which the instep-tape may be slid forward to permit the withdrawal of the foot or insertion or withdrawal of the last.

MARCUS LANE.

Witnesses:
R. L. COBBS,
GUSTAVUS DIETERICH.